United States Patent [19]

Hoffmann

[11] Patent Number: 5,340,169
[45] Date of Patent: Aug. 23, 1994

[54] LOCKING DEVICE FOR LAID PIPES WITH EMBEDDED INSERT

[75] Inventor: Klaus Hoffmann, Kuemmerbruck, Fed. Rep. of Germany

[73] Assignee: Pont-A-Mousson S.A., Nancy, France

[21] Appl. No.: 959,407

[22] Filed: Oct. 13, 1992

[30] Foreign Application Priority Data

Oct. 14, 1991 [FR] France .................. 91 12787

[51] Int. Cl.$^5$ ............................. F16L 17/02
[52] U.S. Cl. ...................... 285/337; 285/104; 285/368; 285/374
[58] Field of Search ............ 285/337, 368, 105, 104, 285/412, 414, 415, 340, 374, 379, 343, 363

[56] References Cited

U.S. PATENT DOCUMENTS

| | | | |
|---|---|---|---|
| 3,065,000 | 11/1962 | Stanton | 285/368 |
| 3,578,362 | 5/1971 | Cauthery | 285/368 |
| 3,761,114 | 9/1973 | Blakeley | 285/368 |
| 3,920,270 | 11/1975 | Babb, Jr. | 285/368 |
| 3,942,141 | 3/1976 | Kaffenberger | 285/414 |
| 4,068,866 | 1/1978 | Saha | 285/105 |
| 4,275,909 | 6/1981 | Yoshizawa et al. | 285/345 |
| 4,606,565 | 8/1986 | Royston | 285/343 |
| 4,613,172 | 9/1986 | Schattmaier | 285/340 |
| 4,640,533 | 2/1987 | Klemm | 285/415 |
| 4,647,083 | 3/1987 | Hashimoto | 285/368 |
| 4,678,211 | 7/1987 | Bateman et al. | 285/412 |
| 4,878,698 | 11/1989 | Gilchrist | 285/368 |
| 5,069,490 | 12/1991 | Halen | 285/337 |
| 5,071,175 | 12/1991 | Kennedy, Jr. | 285/337 |
| 5,193,858 | 3/1993 | Perlebois | 285/412 |

FOREIGN PATENT DOCUMENTS

| | | |
|---|---|---|
| 0312317 | 4/1989 | European Pat. Off. . |
| 3146219 | 5/1983 | Fed. Rep. of Germany . |
| 3436579 | 4/1986 | Fed. Rep. of Germany . |
| 2238886 | 7/1975 | France . |
| 2349783 | 4/1977 | France . |

Primary Examiner—Eric K. Nicholson
Attorney, Agent, or Firm—Sughrue, Mion, Zinn, Macpeak and Seas

[57] ABSTRACT

A locking device for a system of laid pipes comprises a gasket 2 and one or more assembled components which form a hollow cylinder 4 surrounding and accommodating the gasket, the hollow cylinder incorporating an anchoring groove 8. The gasket is elastic and has a solid body portion 9, an integral annular heel member 10, and a plurality of embedded anchoring inserts.

10 Claims, 2 Drawing Sheets

LOCKING DEVICE FOR LAID PIPES WITH EMBEDDED INSERT

BACKGROUND OF THE INVENTION

This invention relates to a locking device designed for use on a system of pipes laid in place.

After a system of pipes is laid at a site, locking cannot be easily accomplished. To lock the system of pipes in place at the site, conventional practice calls for a weld seam, which must be produced with the system in place. To this end, welding equipment, such as an electric welding station, must be brought to the worksite. After welding, an operation involving the restoration of the protective coating of the system of pipes is performed at the site of the weld. Moreover, under some conditions welding proves difficult in a trench.

SUMMARY OF THE INVENTION

A purpose of the invention is to surmount these problems. Accordingly, the locking device according to the invention comprises at least one gasket and one or several components which form a hollow cylinder and which are designed to work in conjunction with the gasket. The hollow cylinder incorporates, on its inner diameter, an annular part, followed by a groove and then a surface whose substantially uniform diameter is less than the diameter of the groove. Moreover, the hollow cylinder comprises an anchoring mechanism. The gasket is formed from at least two components incorporating a solid body, an integral annular heel member, and a locking structure.

According to additional features, the anchoring means of the hollow cylinder comprises a groove, and the locking structure is formed by circumferentially spaced inserts made of a very hard material and embedded in the annular heel member, which is made of an elastic material. Each insert is fitted with a sharp nose which can bite into the pipe surface and which can swivel angularly, during the locking operation, by resting for support on the solid body portion made of elastic material of the gasket.

According to a first variant, the hollow cylinder of the locking device is a one-piece component, the anchoring groove is in the outer diameter of the hollow cylinder, and a ring-shaped flange comprising axial joining means running parallel to the axis of the flange is fastened in the anchoring groove.

In another variant the hollow cylinder is produced in two pieces, and the anchoring groove is provided on the inner diameter of an extension of the hollow cylinder.

The locking device may be used for systems of metal pipes, in particular for cutting a section of locked pipework of the system of pipes laid in place at the worksite, or for locking in position at the worksite a section of unsecured pipework belonging to the installed system of pipes.

DETAILED DESCRIPTION OF THE PREFERRED EMBODIMENTS

Figure 1:
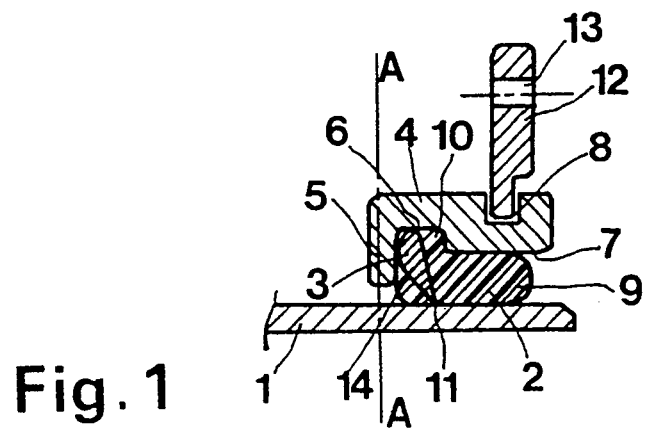
FIG. 1 is a longitudinal half-cross-section of a locking device whose anchoring mechanism is provided on the outer diameter of the hollow cylinder, produced in conformity with the present invention.

The device for locking a system of pipes 1 in place, as shown in FIG. 1, comprises a one-piece gasket 2 and a component forming a hollow cylinder 4 designed to work in conjunction with the gasket. The hollow cylinder 4 incorporates, along its inner diameter, an annular end piece 5, followed by a groove 6, then a surface 7 whose uniform diameter is smaller than the diameter of the groove 6; and, along its outer diameter, a surface of uniform diameter, followed by a groove forming an anchoring mechanism 8.

The gasket 2 is made of an elastic material and comprises a solid body 9 having an integral annular heel member 10, and inserts made of an extremely hard material, e.g., a sintered metal alloy or a ceramic. The inserts are embedded in the annular heel member 10, are evenly spaced around the entire periphery of the gasket, and form a locking structure 3. The inserts are fitted with a sharp nose piece or lip 11 which can bite into the surface of a pipe 1, and which can swivel angularly, during the locking operation, by resting for support on the solid body 9 made of elastic material of the gasket. The nose piece or lip 11 and a portion of the body 14 of each insert project toward the axis X—X of the locking device.

The annular heel member 10 of the gasket 2 is housed or accommodated in the groove 6. The diameters of the surface 7 and of the outer surface of the installed system of pipes 1 have a value such that they form a gap, which produces minimal yet sufficient compression of the elastic solid body 9 of the gasket 2, so as to provide water-tightness.

An adjustable ring-shaped flange 12 is fastened to the anchoring mechanism groove 8 of the hollow cylinder 4. The flange 12 comprises several axial attachment joining elements 13 parallel to the axis of the ring formed by the flange, such axis coinciding with the axis X—X. Each of the axes of the axial joining elements 13 is placed equidistant from the axis X—X, which is greater than the radius of the hollow cylinder 4.

The flange 12, which is locked in place by means of the connection formed by the hollow cylinder 4 and the insert-equipped gasket 2, allows the installation of a component fitted with a similar mounting flange, such as a valve body or a device for the attachment of a smooth tubular end incorporating a water-tight elastic assembly, a position-retention ring, and a jacket fitted with a flange (see French Patent publication No. 2,238,886).

Figure 2:
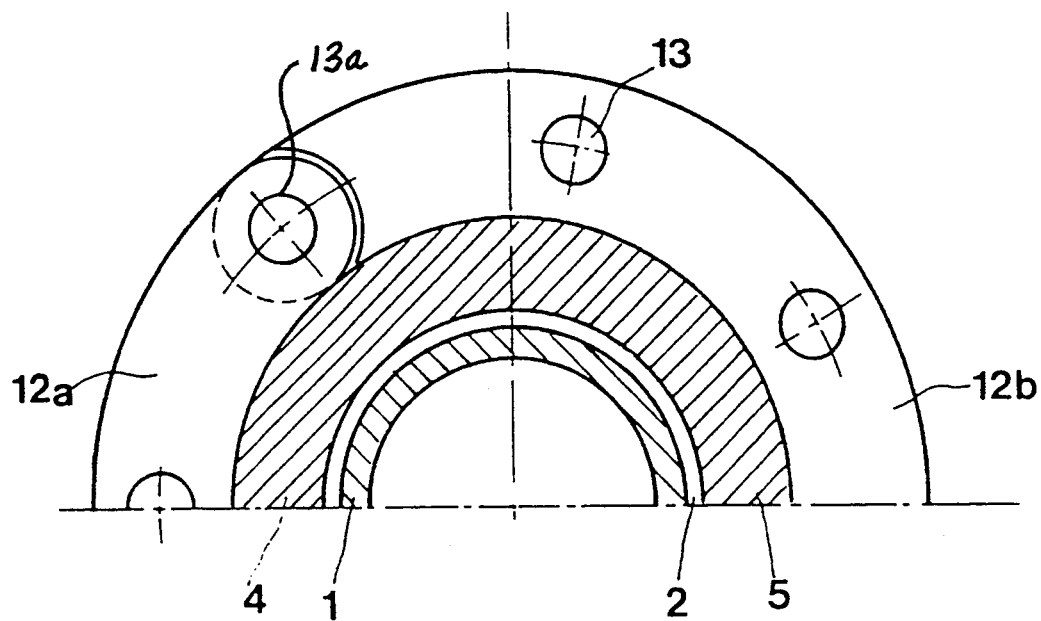
FIG. 2 is a radial cross-section along line A—A in FIG. 1.

The installed system of pipes 1 and the annular part 5 of the hollow cylinder 4 are shown in radial half-section in FIG. 2. The flange 12 and a part of the gasket 2 are shown in front view. The flange 12 is made of two pieces 12a and 12b which are assembled together using the axial joining elements 13a, the two pieces being superposed at the joining element 13a.

When a section of the system of pipes is replaced at the worksite, a pipe of the installed system 1 is cut out and removed. Next, the locking device is mounted on each pipe end created when the cut pipe is remove.

Finally, a new pipe section is mounted and attached using the axial joining elements 13 on the flange 12.

Figure 3:
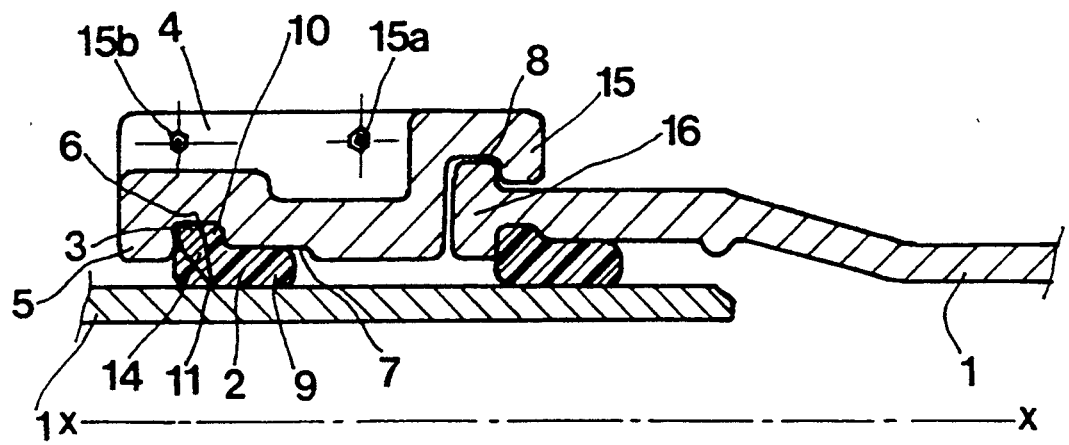
FIG. 3 is a longitudinal cross-section of a locking device whose anchoring mechanism is provided on the inner diameter of the hollow cylinder, produced in conformity with the present invention.
Figure 4:
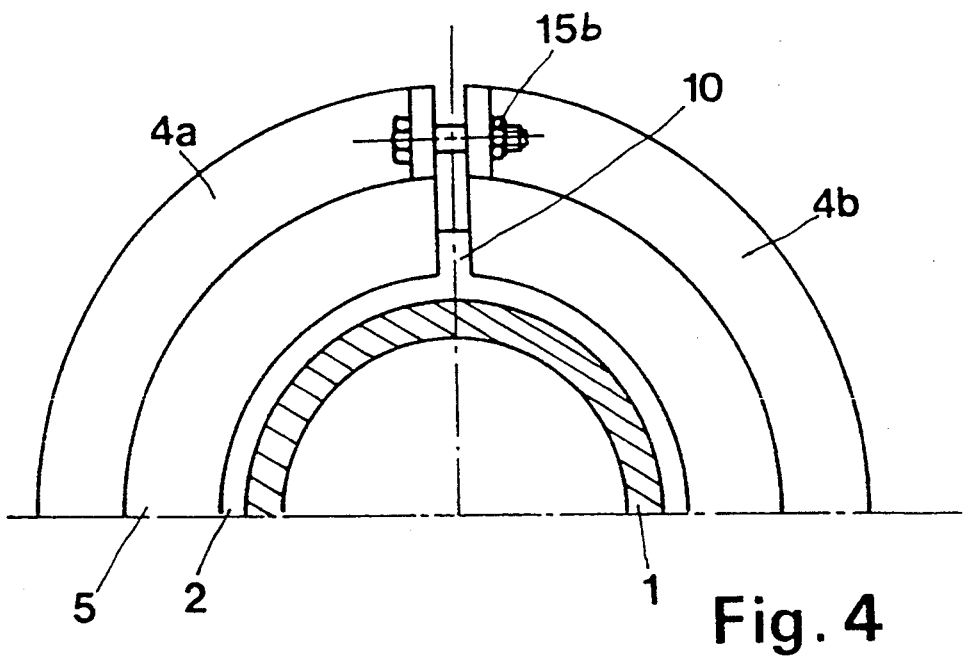
FIG. 4 is a radial view of the locking device in FIG. 3.

FIG. 3 is a half-section of a variant of the invention, which differs from that illustrated in FIG. 1 by virtue of the fact that the anchoring mechanism 8 is provided on the inner diameter of the hollow cylinder 4, at the end opposite the ring-shaped shaped end piece 5. The anchoring mechanism 8 again comprises a groove, and the hollow cylinder 4 ends in a ring-shaped part 15 whose inner diameter is greater than that of the surface 7. The groove houses or accommodates the attachment end 16 of a pipe forming part of the installed system of pipes.

The locking device differs in another way from that shown in FIG. 1, by virtue of the fact that the hollow cylinder 4 is made of two parts 4a and 4b, which are attached to each other using two screw-nut connections 15a and 15b.

To lock a previously installed or loosely laid, but uncoupled, system of pipes 1, the gasket 2 is mounted on the smooth end of a pipe forming part of the system, then each of the two parts 4a and 4b of the hollow cylinder 4 is mounted so as to hold the gasket 2 immobilized by lodging its annular heel member 10 in the groove 6, and to secure the attachment end 16 of the other pipe in the anchoring mechanism 8. Thus, a joined pipe conduit is locked together and in position.

I claim:

1. A locking device for coupling together a system of unthreaded pipes (1) or associated components previously laid in place at a worksite, said device comprising: at least one annular gasket (2), and a hollow cylinder (4) surrounding and housing said gasket, the hollow cylinder defining, along an inner surface thereof, an annular, generally radially oriented end piece (5), followed by a recessed groove (6), followed by a surface (7) having a substantially uniform diameter smaller than a diameter of the groove, the hollow cylinder comprising anchoring means (8), and said gasket comprising a solid body (9), an integral annular heel member (10) disposed in the recessed groove, and a locking structure (3) for retentive engagement with an outer surface of a pipe, wherein the annular heel member is made of an elastic material, and the locking structure (3) comprises at least one insert made of a hard material and embedded in the heel member.

2. A locking device according to claim 1, wherein said anchoring means (8) comprises a fixing groove.

3. A locking device according to claim 1, wherein the solid body (9) of said gasket is made of elastic material, and each insert has a sharp, pipe surface engaging nose (11) and can swivel angularly, during a locking operation, by resting for support on said solid body.

4. A locking device according to claim 2, wherein the anchoring means (8) is provided on an outer surface of the hollow cylinder.

5. A locking device according to claim 4, further comprising a ring-shaped flange (12) having at least one axial joining attachment (13) parallel to an axis of the flange, said flange being disposed in the fixing groove.

6. A locking device according to claim 2, wherein the anchoring means (8) is provided on an inner surface of the hollow cylinder in an extension of the uniform diameter surface (7) thereof.

7. A locking device for coupling together a system of unthreaded pipes (1) or associated components previously laid in place at a worksite, said device comprising: at least one annular gasket (2), and a hollow cylinder (4) surrounding and housing said gasket, the hollow cylinder defining, along an inner surface thereof, an annular, generally radially oriented end piece (5), followed by a recessed groove (6), followed by a surface (7) having a substantially uniform diameter smaller than a diameter of the groove, the hollow cylinder comprising anchoring means (8), and said gasket comprising a solid body (9), an integral annular heel member (10) disposed in the recessed groove, and a locking structure (3) for retentive engagement with an outer surface of a pipe, wherein said anchoring means (8) comprises a fixing groove provided on an outer surface of the hollow cylinder, and further comprising a ring-shaped flange (12) having at least one axial joining attachment (13) parallel to an axis of the flange, said flange being disposed in the fixing groove.

8. A locking device for coupling together a system of unthreaded pipes (1) or associated components previously laid in place at a worksite, said device comprising: at least one annular gasket (2), and a hollow cylinder (4) surrounding and housing said gasket, the hollow cylinder defining, along an inner surface thereof, an annular, generally radially oriented end piece (5), followed by a recessed groove (6), followed by a surface (7) having a substantially uniform diameter smaller than a diameter of the groove, the hollow cylinder comprising anchoring means (8), and said gasket comprising a solid body (9), an integral annular heel member (10) disposed in the recessed groove, and a locking structure (3) for retentive engagement with an outer surface of a pipe, wherein said anchoring means (8) comprises a fixing groove provided on an inner surface of the hollow cylinder in an extension of the uniform diameter surface (7) thereof.

9. A locking device according to claim 5, wherein the hollow cylinder is formed in one piece, and the flange is formed by at least two arc-shaped pieces (12a, 12b) joined together at mating ends thereof to form a ring.

10. A locking device according to claim 6, wherein the hollow cylinder is formed by at least two arc-shaped segments (4a, 4b) joined together at mating axially parallel edges thereof.

* * * * *